Dec. 7, 1954  E. B. LIBBY  2,696,230
CIRCLE SAW WORK CENTER
Filed March 13, 1951  2 Sheets-Sheet 1

INVENTOR.
Elmer B. Libby
BY *Victor J. Evans & Co.*
ATTORNEYS

Dec. 7, 1954      E. B. LIBBY      2,696,230
CIRCLE SAW WORK CENTER
Filed March 13, 1951      2 Sheets-Sheet 2
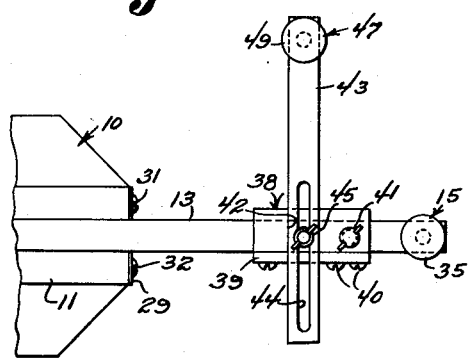
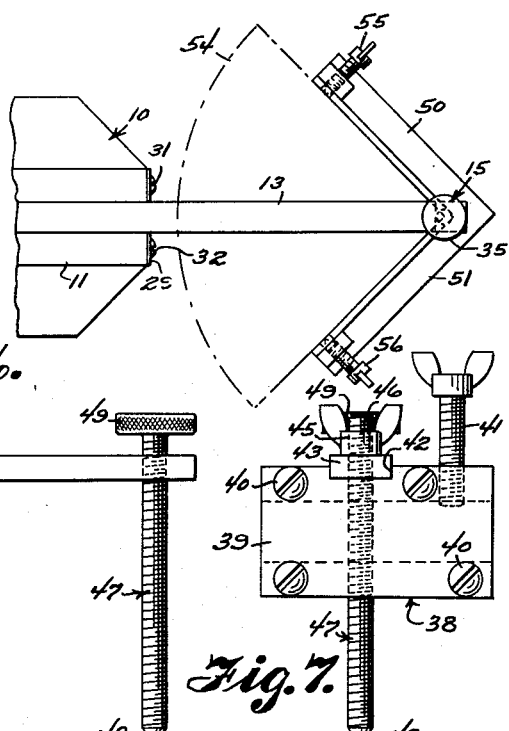
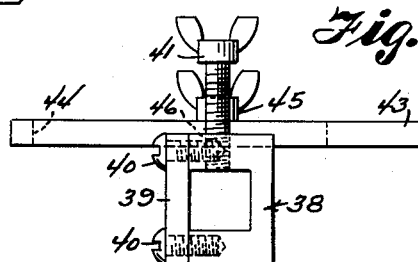
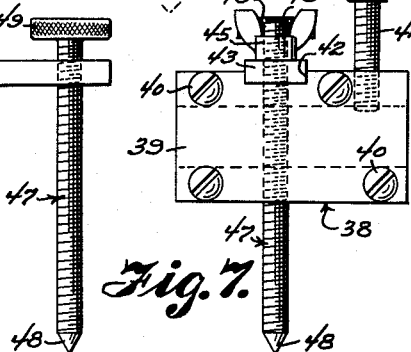
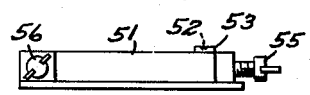
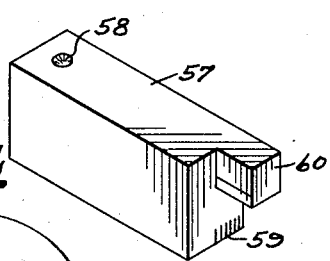
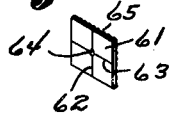
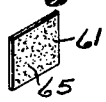
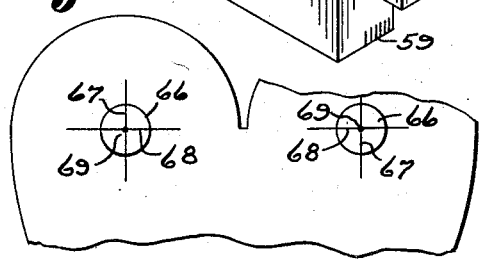
INVENTOR.
Elmer B. Libby
BY Victor J. Evans & Co.
ATTORNEYS

United States Patent Office 2,696,230
Patented Dec. 7, 1954

2,696,230

CIRCLE SAW WORK CENTER

Elmer B. Libby, St. Petersburg, Fla.

Application March 13, 1951, Serial No. 215,363

2 Claims. (Cl. 143—171)

This invention relates to attachments for wood working machinery and particularly circle saws of the type having a saw operating through a slot in a table, and in particular a bracket clamped to the table of the saw and having a center supported by the bracket and positioned to hold work at a point spaced from the saw whereby with the work rotated about a point or center it is cut, by the saw, to form a circular plate or panel.

The purpose of this invention is to provide means for facilitating cutting circles with machine actuated saws.

In trimming arcuate edges or cutting circles from panels and the like it is difficult to hold the center without driving a nail or pin into the saw table and for this reason it is difficult to cut true circles on saws of this type. With this thought in mind this invention contemplates, an arm having a center on the outer end with means for adjustably clamping the arm to the table of a saw whereby work positioned on the center or point on the outer end of the arm is cut to form a circle as it is rotated toward the saw.

The object of this invention is, therefore, to provide means for forming a bracket whereby parallel arms with a point forming a center carried thereby may be adjustably clamped to the table of a circle or band saw.

Another object of the invention is to provide an adjustable work holding center for circle saws that may be mounted on saws without changing the design or construction of the saw.

A further object of the invention is to provide a work holding bracket for positioning centers on circle saws which is of a simple and economical construction.

With these and other objects and advantages in view the invention embodies an elongated base having a T-shaped slot therein with C-clamps for mounting the base on a saw table and an arm with a screw having a point on the lower end adjustably mounted in the T-shaped slot whereby with the arm clamped to the table of a saw the point of the screw may be positioned in spaced relation to the saw for holding work as the work is rotated toward the saw for trimming the edge thereof to form a circle.

Other features and advantages of the invention will appear from the following description taken in connection with the drawings wherein:

Figure 5 is a detail illustrating a modification wherein the center is carried in an arm pivotally mounted on the arm of the bracket.

Figure 6 is an end elevational view illustrating the part of the attachment shown in Fig. 5 and showing the parts on an enlarged scale.

Figure 7 is a side elevational view illustrating the clamping block for holding the adjustable arm shown in Fig. 5.

Figure 8 is a detail illustrating a further application of the device wherein an angle is pivotally mounted on the center of the arm extended from the base of the attachment.

Figure 9 is an elevational view looking toward the inner surface of the angle shown in Fig. 8.

Figure 10 is a side elevational view looking toward the outer surface of the angle shown in Fig. 8.

Figure 11 is a detail illustrating a gauge used for setting the center in relation to the saw.

Figure 12 is a center holding plate adapted to be mounted on the upper surface of the panel or the like and positioned to receive the point following the center.

Figure 13 is a view looking toward the under surface of the plate shown in Fig. 12 showing that the under surface thereof may be covered with an adhesive.

Figure 14 is a detail showing a portion of the panel in which a plurality of arcuate surfaces have been cut by the saw.

Figure 1:
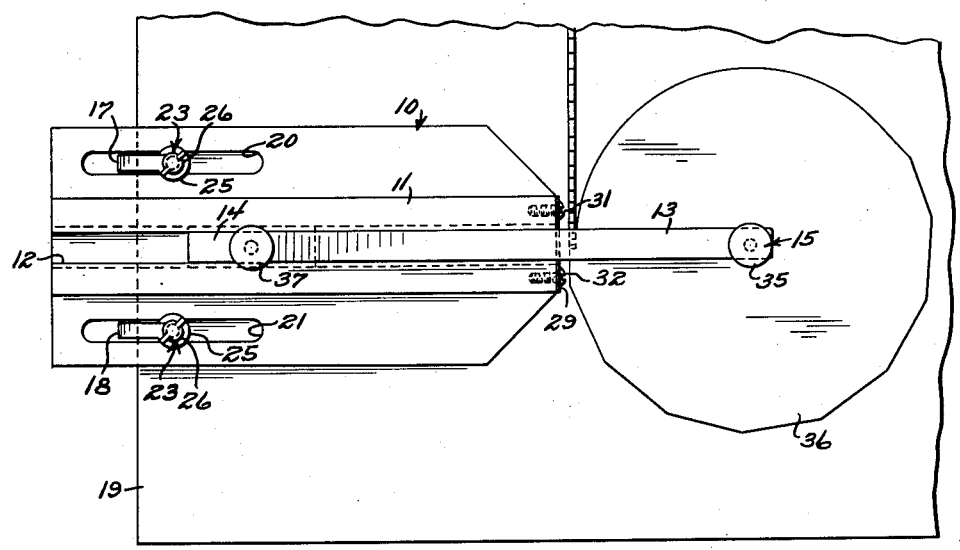
Figure 1 is a plan view showing a portion of a table or circle saw with the work holding attachment mounted thereon.

Referring now to the drawings wherein like reference characters denote corresponding parts the circle saw work holding center of this invention includes a base 10 having an elongated bar 11 with a dove tail or T-shaped slot 12 therein, an arm 13 having a base 14 for slidably mounting the arm in the slot 12, a screw 15 having a point 16 on the lower end, and C-clamps 17 and 18 for clamping the base 10 to a table top 19.

Figure 2:
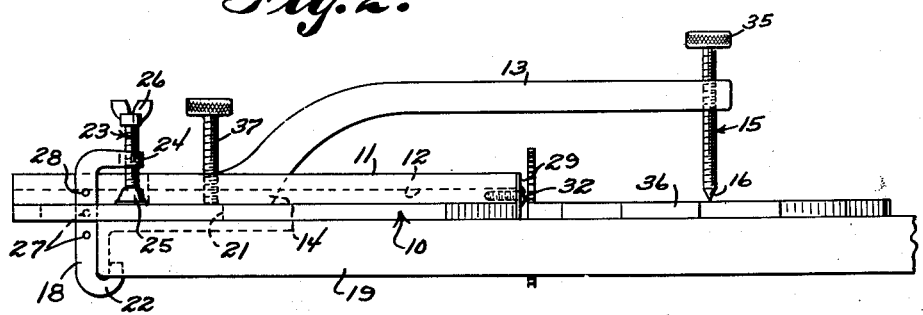
Figure 2 is a side elevational view also showing the work holding attachment mounted on the table of a circle saw.

The base 10 is provided with elongated slits or slots 20 and 21 through which the clamps 17 and 18 extend and, as illustrated in Figs. 1 and 2 each clamp is provided with a hook 22 on the lower end and an adjusting screw 23 in the upper end which is threaded through a hub 24. Each screw is provided with a washer 25 and a wing nut-like head 26. The clamps are provided with spaced openings 27 by which the clamps are adjustably mounted in the base by pins 28.

A plate 29 having an index point 30 on the face thereof is attached to the inner end of the elongated bar 11 by screws 31 and 32 that extend through openings 33 and 34, respectively.

Figures 3, 4:
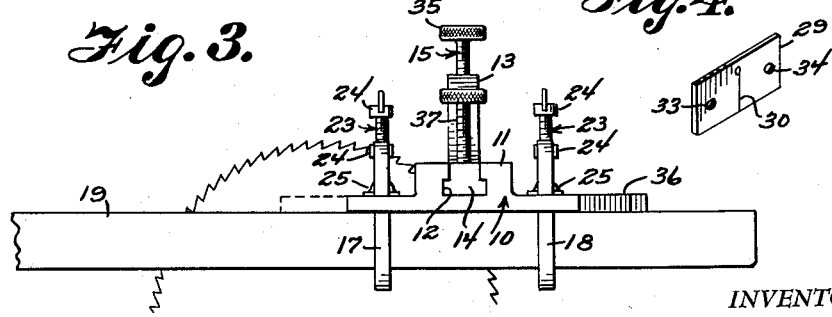
Figure 3 is an end elevational view of the attachment looking from a point at right angles to that shown in Fig. 2 and illustrating the slot and clamping elements of the attachment.
Figure 4 is a detail illustrating a stop or plate positioned on the inner end of the attachment for limiting movement of the point carrying arm.

The base 14 of the arm 13 is T-shaped in cross section to correspond with the slot 12, as illustrated in Fig. 3 and the arm portion 13 extends upwardly and outwardly beyond the end of the bar 11 so that the point 16 on the lower end of the screw 15 may be positioned beyond the end of the base 10. The screw 15 is provided with a head 35 by which it may be rotated to adjust the elevation thereof in relation to the thickness of a panel 36 for other work that it is desired to cut in circles.

The base 14 of the arm 13 is provided with a thumb screw 37 for clamping the arm in adjusted position.

By this means the center or point 16 may be adjustably mounted on the saw table and set at a point spaced from the saw the distance corresponding to the radius of a circle desired to be cut by the saw.

In the design illustrated in Fig. 5 the block 38, U-shaped in cross section, and illustrated in Fig. 6 is mounted on the arm 13 and the block, which is provided with a cover plate 39, that is secured thereto by screws 40, is clamped in adjusted positions on the arm 13 by a thumb screw 41.

The upper surface of the block 38 is provided with a slot 42 and an arm or strip 43 having an elongated slot 44 therein is positioned in the slot 42 and this arm is secured in adjusted position by a thumb nut 45 on a stud 46. The outer end of the arm 43 is provided with a screw 47 that is formed with a point or center 48 on the lower end, similar to the screw 15 shown in Fig. 2, and the screw 47 is provided with a head 49 by which the position thereof is readily adjusted. By this means a center may be located to one side of the saw or at one side of the mounting bracket, and it will be understood that the center may be located in any suitable position in relation to the saw whereby small or large circles may be cut, as may be desired.

In the design illustrated in Figs. 8, 9 and 10 an angle having arms 50 and 51 is positioned on the saw table with the point 16 of the screw 15 positioned in a recess 52 in a boss 53 on the upper surface thereof, as illustrated in Fig. 9 and work, as indicated by the dot and dash lines 54 that is clamped in the angle by thumb screws 55 and 56, may be cut to form quarters of circles.

The attachment may be provided with a gauge block 57 as illustrated in Fig. 11, and this block is provided with a center opening 58 that is spaced from one end and graduations 59 on the opposite end. The end on which the graduations 59 are provided is also provided with an extension 60 to facilitate positioning the center in relation to the saw.

The attachment may also be provided with center holding plates 61 as illustrated in Figs. 12, 13 and 14, the plate, shown in Fig. 14 being round whereas the plates shown in Figs. 12, and 13 are square. One side of the plate 61 is provided with lines 62 and 63 that are positioned at right angles and the point of intersection is provided with an opening 64 to receive the point or center. The opposite side of the plate is provided with an adhesive coating as indicated by the numeral 65 as shown in Fig. 13.

The center locating plate 66, shown in Fig. 14 is also provided with crossed lines 67 and 68. These lines being also positioned at right angles and the point of intersection being provided with an opening or recess 69 for receiving the center. The members shown in Figure 11 can be used for setting the block to obtain a perfect circle so that the material can be cut on a circular saw. The block shown in Figure 11 may be made in different depths to accommodate different thicknesses of materials being used. The members shown in Figures 12 and 13 may be made in a circular form or they may have a square shape. The members shown in Figures 12 and 13 are arranged in position when the work is laid out, and if the wood being worked on is of a soft nature, these members will not mar or scratch the wood.

Where the points are located in material to be cut away these plates are not required however where it is desired to locate the center on a finished surface one of the plates 61 or 66 may be positioned on the work and the plate may be secured to the work by an adhesive or other suitable means.

With the attachment formed in this manner a center for holding work in relation to a table or circle saw may be positioned at any suitable point in relation to the saw and circles may be readily cut by the saw.

It will be understood that modifications may be made in the design and arrangement of the parts without departing from the spirit of the invention.

What is claimed is:

1. In a work holding center for a circle saw, a base, an elongated bar mounted on said base and provided with a T-shaped slot therein, an arm having a base portion of T-shape slidably mounted in said slot, said base being provided with a pair of spaced parallel slits, C-clamps in said slits each provided with a hook on its lower end and a hub on its upper end, an adjusting screw extending through said hub, pins for adjustably connecting said clamps to said base, a plate provided with an index point secured to the inner end of said bar, a screw extending through the free end of said arm and provided with a point on its lower end, a head on the upper end of said screw, a thumb screw for clamping said arm in its adjusted positions, a U-shaped block mounted on said arm, a cover plate secured to said block, the upper surface of said block being provided with a slot therein, a strip seated in said slot and secured therein, and a screw member carried by the outer end of said strip and provided with a lower pointed end.

2. In a work holding center for a circle saw, a flat elongated base, a horizontal bar mounted on the longitudinal center line of said base and provided with a longitudinal T-shaped slot therein, an arm having a base portion of T-shape slidably mounted in said slot, clamps each provided with a hook on its lower end and a hub on its upper end, an adjusting screw extending through said hub, pins for adjustably connecting said clamps at their intermediate portion to said base whereby the base may be clamped to a table top, a plate provided with an index point secured to and across the inner end of said bar, a screw extending through the free end of said arm and provided with a point on its lower end, a head on said screw, a thumb screw for clamping said arm in its adjusted positions in said slot, a block mounted on said arm, a cover plate secured to said block, the upper surface of said block being provided with a slot therein, a strip seated in said slot and secured therein, and a screw member carried by said strip and provided with a lower pointed end.

References Cited in the file of this patent

UNITED STATES PATENTS

| Number | Name | Date |
| --- | --- | --- |
| 403,618 | Springstead | May 21, 1889 |
| 997,463 | McWold | July 11, 1911 |
| 1,426,932 | Wallace | Aug. 22, 1922 |
| 1,639,039 | Knabusch et al. | Aug. 16, 1927 |
| 1,741,082 | Thiel | Dec. 24, 1929 |

FOREIGN PATENTS

| Number | Country | Date |
| --- | --- | --- |
| 41,798 | Switzerland | Dec. 4, 1907 |